Aug. 13, 1929.   S. D. LOCKE ET AL   1,724,847
APPARATUS FOR MAKING CHAIN
Filed April 27, 1925   7 Sheets-Sheet 5
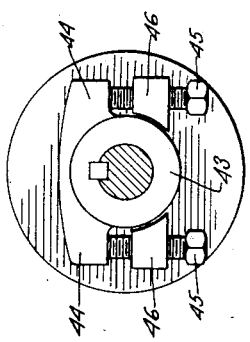
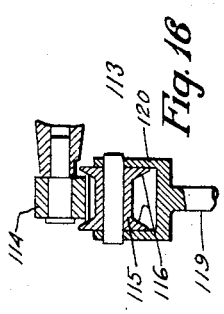
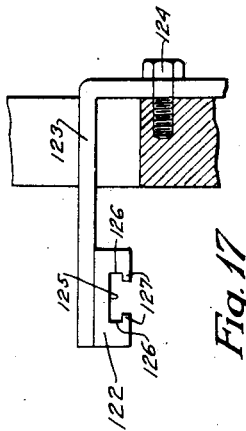
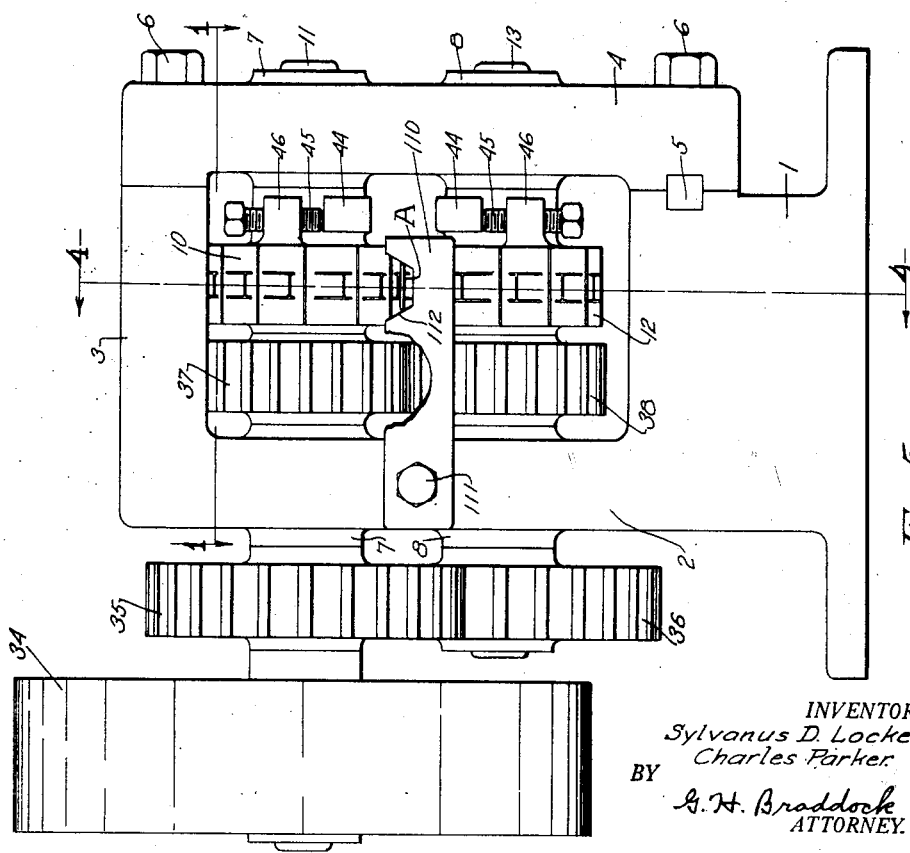
INVENTORS
Sylvanus D. Locke
Charles Parker
BY G. H. Braddock
ATTORNEY.

INVENTORS
Sylvanus D. Locke.
Charles Parker
BY G. H. Braddock
ATTORNEY.

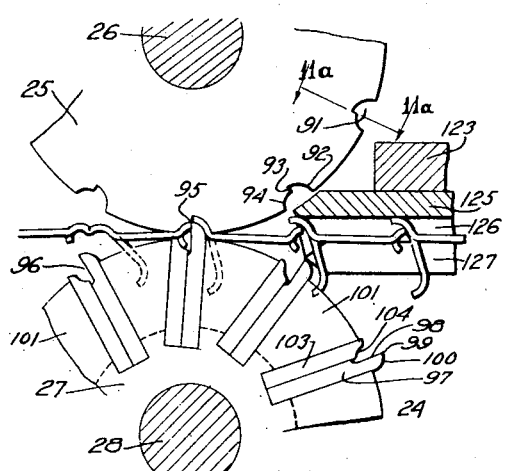
Fig. 11
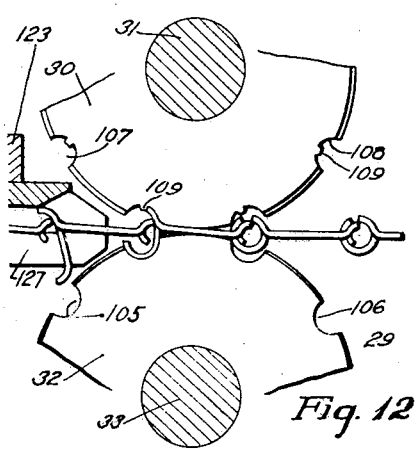
Fig. 12
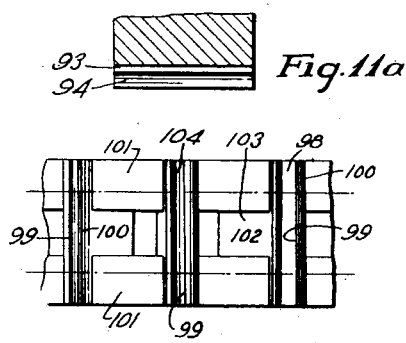
Fig. 11a
Fig. 11b
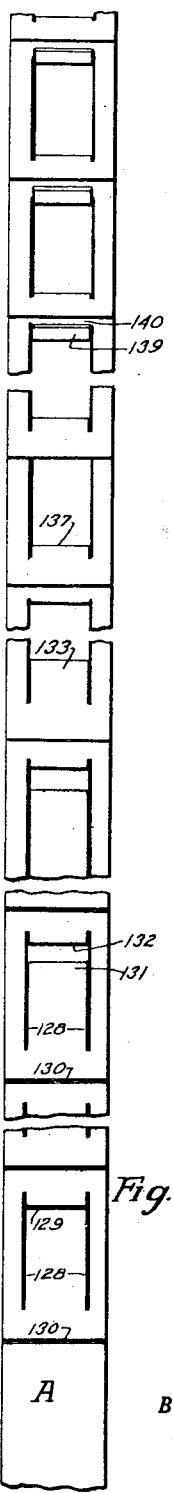
Fig. 13
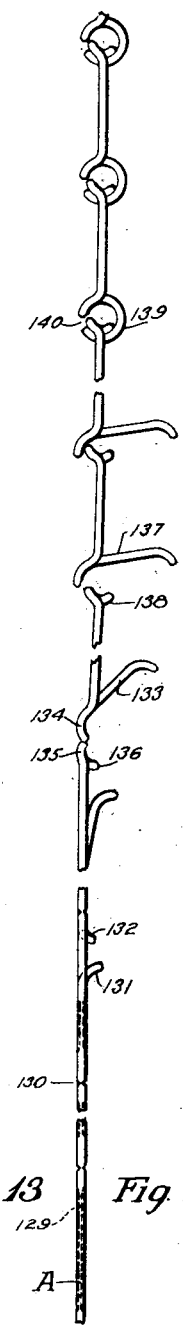
Fig. 14
INVENTORS
Sylvanus D. Locke.
Charles Parker.
BY G. H. Braddock
ATTORNEY.

Patented Aug. 13, 1929.

1,724,847

UNITED STATES PATENT OFFICE.

SYLVANUS D. LOCKE AND CHARLES PARKER, OF BRIDGEPORT, CONNECTICUT, ASSIGNORS TO THE LOCKE STEEL CHAIN COMPANY, OF BRIDGEPORT, CONNECTICUT, A CORPORATION OF CONNECTICUT.

APPARATUS FOR MAKING CHAIN.

Application filed April 27, 1925. Serial No. 26,279.

This invention relates to an apparatus for and a process of making chain links and assembling the same, and has more especial reference to an apparatus and a process for operating upon a strip of metal while the same is continuously fed to transform the strip into connected chain links. This application relates to an improvement upon the subject matter claimed in the copending application of Charles Parker, Serial No. 611,479.

Chain links have been formed and assembled by utilization of various combinations of dies (mostly reciprocatory and stationary dies) designed to move relatively to each other, but, so far as we are aware, chain links have not heretofore been formed and assembled by utilization of dies the working elements of which have forward motion with a strip of metal, in addition to their motions necessary to accomplish transformation of the strip into connected chain links.

It is an important object of this invention to provide an apparatus for and a process of successively transforming strip metal into connected chain links wherein the operations upon the strip are performed concurrently with the feeding thereof, whereby production of chain can be more rapid.

It is a further important object of the invention to provide an apparatus for and a process of making chain wherein the working elements have forward motion with a strip of metal, as well as the motions necessary to transform the strip into connected chain links.

Another important object of the invention is to provide an apparatus for and a process of making chain links which contemplate the employment of a plurality of different sets of working elements adapted to perform step by step operations upon metal stock to transform the same into links concurrently with the feeding of the stock past said different sets of working elements.

Another important object of the invention is to provide an apparatus for and a process of making chain wherein the different forming elements are carried by separate pressure producing elements to reduce the load on the pressure producing elements and greatly reduce their size.

Another important object of the invention is to provide an apparatus for and a process of making chain wherein the preliminary scoring, shearing and forming operations are performed by working elements which move uniformly and gradually toward and into the stock, whereby the work in each operation is done gradually and with little pressure instead of at once and by heavy pressure, as with flat reciprocating dies.

Another important object of the invention is to provide an apparatus for making chain links and assembling them wherein no feed mechanism other than the working elements or dies themselves is required, whereby waste at the ends of the coils is greatly reduced, said elements and dies being capable of accounting for the feeding of the metal strip, as well as for the feeding of the finished chain out of the machine, and the feeding of the severed links between the strip and chain.

Another important object of the invention is to provide an apparatus of the character hereinbefore stated, including mechanism for making chain links and assembling them, and also including mechanism for stretching said links when made up to a predetermined size.

And a further important object of the invention is to provide a novel mechanism and arrangement for insuring that the strip metal will align with the working elements of the machine.

Other objects and advantages will become apparent from the drawings and description of construction and operation of a machine embodying the invention herein selected for the purpose of illustration.

Fig. 5 is an end view of the machine;

Figure 8:
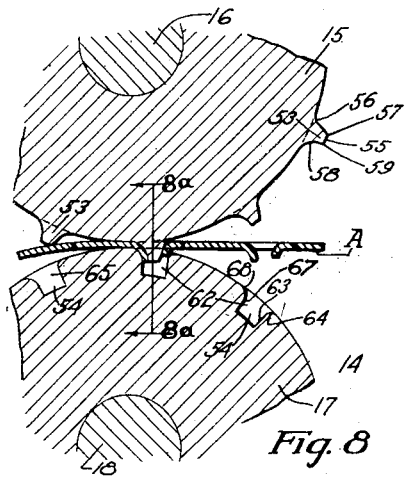
Fig. 8 is an enlarged fragmentary vertical sectional view detailing the second set of rolls.
Figure 9:
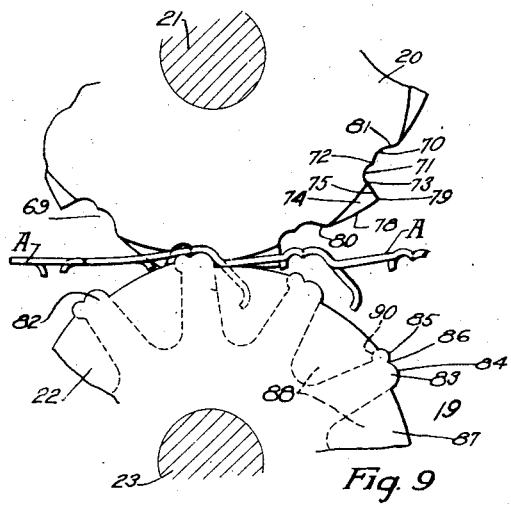
Figure 10:
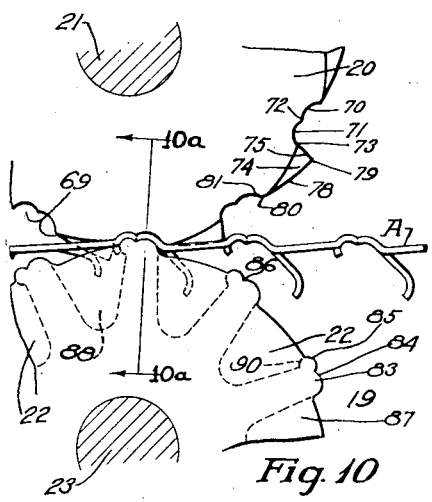
Figures 8A, 10A, 10B:
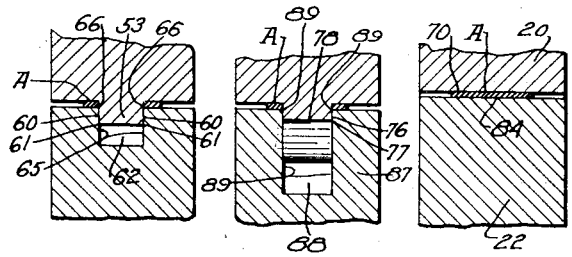

Fig. 8$^a$ is a sectional view on line 8$^a$—8$^a$ in Fig. 8;

Fig. 9 is an enlarged fragmentary elevational view detailing the third set of rolls;

Fig. 10 is an elevational view corresponding with the showing of Fig. 9, disclosing the rolls of the third set rotated to slightly different positions on their axes;

Fig. 10$^a$ is a sectional view on line 10$^a$—10$^a$ in Fig. 10;

Fig. 10$^b$ is a sectional view corresponding with the showing of Fig. 10$^a$, but disclosing the rolls rotated to still a different position on their axes;

Fig. 11 is an enlarged fragmentary elevational view detailing the fourth set of rolls, disclosing in section the receiving guide for the severed blanks;

Fig. 11$^a$ is a sectional view on line 11$^a$—11$^a$ in Fig. 11;

Fig. 11$^b$ is a fragmentary plan view detailing the lower roll of Fig. 11;

Fig. 12 is an enlarged fragmentary elevational view detailing the fifth set of rolls;

Fig. 13 is a plan view of a strip of metal in process of formation into chain, some severed links, and some formed and coupled links being shown;

Fig. 14 is an edge view of the metal strip, severed links, and chain shown in Fig. 13;

Fig. 15 is a detail of mechanism whereby each rotatable die can be adjustably fastened on its axis, to be slightly advanced or retarded to synchronize with the operations performed by other rotatable dies;

Fig. 16 is a detail of mechanism for assisting in the guiding of the strip; and

Fig. 17 is a detail of the receiving guide for the severed blanks.

In the drawings, 1 indicates the base of the machine, 2 a vertical upright integral with the base and extending the length thereof, 3 a horizontal extension of the upper portion of the upright 2 lying directly above the base, and 4 indicates a vertical upright, spaced from upright 2, detachably secured to the base 1 and extension 3, numeral 5 (Fig. 5) suggesting a machined key-way for accurately locating the upright 4. As shown, the base 1, upright 2, and extensions 3 are constituted by a casting, the upright 4 consisting of a different casting bolted as at 6 to the base and extensions. The uprights or their equivalents could be provided in any other suitable manner.

The machine includes oppositely disposed, forwardly driven rolls, there being an upper roll and a lower roll for each operation, or segregated series of operations, required to produce chain, and the rolls are arranged so that all of the operations will synchronize.

7 represents upper rows of bushings in the uprights 2 and 4, respectively, one row in each upright, the corresponding bushings in each row being arranged directly opposite each other in the same horizontal plane, and 8 represents lower rows of bushings, one row in each upright, corresponding bushings in each row being similarly arranged. The bushings provide bearings for the shafts of the rolls or rotatable dies.

As shown, there are five sets of rolls or rotatable dies, one set for each operation (or segregated series of operations) to be performed in the machine, and the upper rotatable dies and lower rotatable dies, respectively, are located with respect to each other to position in a single horizontal plane the whole length of the strip metal and severed links being operated upon. The upper and lower rotatable dies of a set have proper relation to best perform their intended function. It is to be understood that a greater or less number of sets of dies can be utilized without departing from the spirit of the invention.

There is a rearward set of rolls or rotatable dies 9, for the first operation (or series of segregated operations) in the machine, including an upper rotatable die 10 upon shaft 11 in bushings 7, and a lower oppositely disposed rotatable die 12 upon shaft 13 in bushings 8. These dies preferably include in their structure the forming tools for completely outlining the individual links of the chain to be produced.

The second set of rolls 14, for the second operation (or series of segregated operations), include oppositely disposed upper rotatable die 15 upon shaft 16 and lower rotatable die 17 upon shaft 18. These dies preferably include in their structure the severing and forming tools for severing and crimping or forming the free end of the central portion or long lip of the link blank to be employed in forming the large end or sprocket bar of the link, and for severing and crimping or preliminarily forming the central portion or narrow lip of the small end bar or pintle of said link.

The third set of rolls 19, for the third operation (or series of segregated operations), include oppositely disposed upper rotatable die 20 upon shaft 21 and lower rotatable die 22 upon shaft 23. These dies preferably include in their structure the severing and forming tools for severing the body of said central portion or long lip of the link blank adjacent its severed and crimped or formed end, for throwing the short, wide lip of the sprocket bar of the link upwardly and the severed long, narrow lip thereof downwardly, and for simultaneously bending, forming, or shaping said short, wide lip of the sprocket bar to final form, and the third set of dies also include forming tools for bending, forming, or shaping the short, wide lip and the short, narrow lip of the small end bar or pintle to final form.

The fourth set of rolls 24, for the fourth operation (or series of segregated operations), include oppositely disposed upper rotatable die 25 upon shaft 26, and lower rotatable die 27 upon shaft 28. These dies preferably include in their structure the severing and forming tools for severing the link from the strip and for simultaneously throwing the short, wide lip of the sprocket bar of the link further upwardly, and the long, narrow lip thereof further downwardly, in order that the end hook will be in its final forming and assembling position, and the fourth set of dies also include forming tools for operating upon the wide lip and narrow lip of the small end bar or pintle of the following or succeeding link, adjacent a severed link, to finally position said small end bar at desired angle with respect to the side bars of said link.

The last set of rolls 29, for the last operation (or series of segregated operations) to provide chain, include oppositely disposed upper rotatable die 30 upon shaft 31 and lower rotatable die 32 upon shaft 33. These dies preferably include in their structure the final end hook shaping and link assembling tools.

The rotatable dies may be driven forwardly in any manner, as by a belt pulley 34 fixed upon the shaft 11, the pulley rotating in the direction of the arrow as indicated in the drawing. As shown, the rotation of the dies is accomplished and synchronized by means of a train of gears, there being a gear 35 fixed upon the shaft 11 and meshing with a gear 36 upon shaft 18 to accomplish forward feeding of the first two sets of rolls. Smaller gears 37, one upon each shaft of the upper rotatable dies, mesh with similar gears 38, one upon each shaft of the lower rotatable dies, in the instance of each set of rolls, to insure the proper relative rotating arrangement of the dies of a set, and the remainder of the gear train for driving the rotatable dies may be as follows: The gear 36 meshes with a gear 39 upon the shaft 21 of the upper die 20 to rotate the third set of rolls. The gear 39 meshes with a gear 40 upon the shaft 28 of the die 27 to rotate the fourth set of rolls, thus rotating, through the small gears 37 and 38, the shaft 26 of the upper die 25. A gear 41 upon this shaft 26 meshes with a gear 42 upon the shaft 33 of the lower die 32 of the last set of rolls, thus imparting movement of rotation to the last set.

The rotatable dies can be fixed against longitudinal movement on their axes (between the uprights 2 and 4) in any suitable manner, to insure that all of the rotatable dies will be in aligning relation, and the dies can be adjustably fastened to their axes, to be advanced or retarded to synchronize the operations upon the machine, as by drivers 43 keyed upon the shafts of the rotatable dies and having extensions 44 supplying stops for adjustable set screws 45 in lugs 46 rigid with the rotatable dies, the rotatable dies being locked against rotation upon the shafts by the engagement of the set screws with the extensions.

Each rotatable die contains a plurality of duplicate chain forming elements, and the tools of the elements of the opposite dies of each set of rolls are complements of each other, there being as many elements upon each lower die as there are elements upon the upper die opposite it, and the elements of the upper die and lower die of a set are correspondingly arranged about the circumferences or peripheral margins of the dies to cooperate with each other in performing the particular work to be performed. The word "element" as herein used refers to a tool (or series of tools) of a die to cooperate with a duplicate or complemental tool (or series of tools) of an oppositely arranged die in performing a working operation in the machine.

As before mentioned, the rearward or first set of dies, to accomplish the first operation (or series of segregated operations) in the machine, may include the forming tools for completely outlining the individual links of the chain to be produced.

47 are scoring knives of the duplicate elements arranged upon the upper die 10 of the first set of rolls adapted to impart lines of score to the upper surface of a strip of metal, which lines are parallel in the direction of the feed of the strip. 48 is a scoring knife of each element of the upper die 10 adapted to impart lines of score at right-angles to the lines imparted by the scoring knives 47, this scoring knife 48 being situated not far from the forward ends of the scoring knives 47 to span the distance between said knives 47. 49 is a scoring knife of the duplicate elements of the upper die 10 adapted to impart a transverse score to the strip of metal along the line of severance of two links which are to adjoin each other. 50 are scoring knives of the duplicate elements upon the lower die 12 corresponding with the scoring knives 47 and arranged to impart lines of score to the under face of the strip of metal, each of which lines is directly beneath a line of score imparted by one of the upper scoring knives 47. 51 is a scoring knife of each element of the lower die 12, corresponding with the scoring knives 48, to impart its line of score directly beneath a line of score of a knife 48. 52 is a scoring knife of the duplicate elements of the lower die 12 adapted to impart its line of score directly beneath a line of score of a transverse knife 49.

The second set of dies, to accomplish the second operation (or series of segregated operations), may include the working tools for severing and crimping or forming the free end of the central portion or long lip of each link blank to be employed in forming the large end or sprocket bar of the link, and for severing and crimping or preliminarily forming the central portion or narrow lip of the small end bar or pintle of said link.

53 represents each of the severing, crimping and forming elements of the upper die 15 of the second set of rolls, and 54 represents each of the complemental severing, crimping and forming elements of the lower die 17 of said second set. The elements 53 and 54 are essentially for the purposes of breaking through the metal on the lines of score made by the knives 47, 50 and 48, 51, of crimping or forming the free end of the long, narrow lip of the sprocket bar, and of crimping or preliminarily forming the narrow lip of the small end bar or pintle adjacent said lines of score 48, 51. As shown, each element 53 includes a severing and crimping punch 55 having a forward, concave, arc shaped crimping surface 56, merging in the circumference of said die 15, and defining a transverse crimping edge 57; a rearward, concave, substantially quarter-circle crimping surface 58, also merging in the circumference of said die 15, and defining a transverse crimping edge 59; and parallel side faces 60, perpendicular to the axis of the die 15, defining spaced apart, parallel severing edges 61 perpendicular to the crimping edges 57, 59. Each element 54 is constituted by a depression 62 in the peripheral face of the die 17 to receive the severing and crimping punch 55. The forward portion of the depression is defined by an approximately radial face 63 providing a convex crimping surface 64 to cooperate with the crimping surface 56 and crimping edge 57 in crimping or preliminary bending, shaping, or forming the central portion or narrow lip of the short end bar or pintle of a link as it is severed along the lines of score by the punch 55. To the rear of the radial face 63 the depression 62 has parallel side walls 65, perpendicular to the axis of the die 17, defining spaced apart severing edges 66 perpendicular to the crimping surface 64. The rearward portion of each depression 62 is defined by an approximately radial face 67 merging in a transverse, substantial quarter-circle 68, itself merging in the circumference of the die 17. The quarter-circle 68 is a convex crimping surface to cooperate with the crimping edge 59 and the crimping surface 58 in crimping or forming the forward or free end of the central portion or long, narrow lip of the sprocket or large end bar of a link. The action of the severing edges 61 and 66 is to sever the metal of a link blank along the lines of score made by the scoring knives 47, 50, and the action of the severing and crimping punch is to simultaneously sever the metal of the blank along the lines of score made by said scoring knives 48, 51, whereby the crimping edges and crimping surfaces at the front and rear of each element 53 and 54 can operate in the manner described. The action of said crimping edges and crimping surfaces as illustrated is to throw the severed free end of the central portion or long lip and the narrow lip of the small end bar of the link downwardly below the plane of the strip of metal and to give to said free end substantially a quarter-circle crimp, and to said narrow lip a crimp or preliminary forming which is a trifle less than a quarter-circle.

Clearly, two or more sets of die elements may be substituted for the upper and lower duplicate elements for performing the first or second operation (or operations), as well as for the duplicate elements of each set for performing the other operations, the substitution of additional sets requiring the utilization of additional sets of tools to accomplish the ultimate result with a plurality of sets instead of with one set as shown; that is, to have in the machine more than five stations of link forming and assembling operations as illustrated. Or, the ultimate result could be accomplished in a machine having less than five stations.

The third set of dies, to accomplish the third operation (or series of segregated operations), may include the working tools for severing the body of the central portion or long, narrow lip of each link blank adjacent its severed and crimped or formed end portion, for throwing the short, wide lip of the sprocket bar upwardly and the severed long, narrow lip thereof downwardly, and for simultaneously bending, forming, or shaping said short, wide lip of the sprocket bar to its final form, and the third set of dies may also include the working tools for bending, forming, or shaping the wide lip of the small end bar or pintle to its final form, and for finally bending, forming, or shaping the narrow lip of said small end bar or pintle.

Each of the elements 69 of the upper die 20 of the third set of rolls includes a transverse, concave crimping surface 70, substantially a quarter-circle. Directly to the rear of the quarter-circle 70 and contiguous therewith is a transverse, concave crimping surface 71, also substantially a quarter-circle, said quarter-circles 70 and 71 extending the full width of the die 20 and meeting each other at the transverse line 72 which is a slight distance away from the circumference of the die 20, within the confines of said die. At the rear end 73 of the quarter-circle 71, which terminates in the circumference of the die 20, is a shearing and bending projection 74 having a transverse, oblique forward crimping face 75, of less width than the die and arranged centrally thereof, extending outwardly from said rear end 73 and the perimeter of said die. To the rear of the face 75 the shearing and bending projection has parallel side faces 76, perpendicular to the face 75, defining circumferentially extending cutting edges 77 for shearing the metal of a blank along the lines of score made by the scoring knives 47, 50 to define the body of the central portion or long, narrow lip of the sprocket or large end bar, the free or outer end of said long lip having already been severed and crimped in the second set of rolls. The outer face 78 of the shearing and bending projection 74 extends circumferentially of the die 20 and slants gently from the outer edge 79 of the face 75 inwardly and rearwardly toward the perimeter of the die 20, terminating in a transverse, smooth, short, curved shaping face 80 itself terminating in the perimeter of the die 20 at the forward end 81 of the quarter-circle 70 of the adjacent rearward element 69. Each element 82 of the lower die 22 of the third set of rolls includes an end-bar-forming punch 83 consisting of a pair of transverse, convex crimping surfaces 84 and 85, complemental to the surfaces 70 and 71, respectively, of the die 20. The crimping surfaces 84 and 85 extend the full width of the die 22, and meet each other along the transverse line 86 complemental to the transverse line 72. The lower die 22 includes approximately circular spaced apart flanges 87 providing a space 88 between the flanges of approximately the width of the long, narrow lip for the sprocket or large end bar of the link. The peripheral surfaces of these flanges are constructed to engage the side bars of a link blank as the same passes between the rolls of the third set, to cooperate with the perimeter or circumference of the upper die 20 in insuring forward, horizontal feeding of the metal strip during the shaping of the end bars on this, the third set of rolls. See Figs. 9, 10, 10ᵃ and 10ᵇ. The inner edges 89 of the flanges 87 provide in the case of each element 82 cutting edges complemental to the cutting edges 77 of the die 20. The combined action of the cutting edges 77 and 89 is to sever the metal of the stock along the lines of score 47, 50 to define the body of the long, narrow lip of the sprocket bar adjacent the forward or free end thereof, already severed and crimped or formed by the second set of rolls. The combined action of the complemental quarter-circles 70, 84, and 71, 85, and of the short, curved shaping surface 80 and the projection 74, which surface and projection cooperate with the quarter-circle 84, is to throw the short, wide lip of the sprocket bar upwardly and the severed long, narrow lip thereof downwardly, and to simultaneously shape said short, wide lip to final, preferably quarter-circle form; and to shape the wide lip of the small end bar to quarter-circle configuration and to finally shape the narrow lip of said small end bar or pintle. The long, narrow lip of the sprocket bar moves downwardly in a circle into the space 88 between the flanges 87 and elements 82, the curved surface 80 insuring desired circular movement of said long, narrow lip. The quarter-circles 70 and 84 directly engage the opposite faces of the short, wide lip of the sprocket bar to throw said short, wide lip upwardly slightly and give it a quarter-circle curve. The quarter-circles 71 and 85 directly engage the wide lip of the small end bar to give it a quarter-circle curve. The transverse lines 72 and 86 engage the opposite faces of the strip of metal between the wide lips of the end bars of adjacent links, along the transverse lines of score made by the scoring knives 49, 52, during the shaping of said end bars by the quarter-circles. The crimping face 75 cooperates with a curved portion 90 which is an extension of the quarter-circle 85 of the punch 83 to further shape and round the already crimped and preliminarily shaped narrow lip of the small end bar or pintle. See Figs. 9 and 10.

The fourth set of dies, to accomplish the fourth operation (or series of segregated operations), may include the working tools for severing the link from the strip and for simultaneously throwing the short, wide lip of the sprocket bar of the link further upwardly, and the long, narrow lip thereof further downwardly, in order that the end hook will be in its final forming and assembling position, and the fourth set of dies may include the working tools for operating upon the narrow and wide lips of the small end bar or pintle of a following or succeeding link, adjacent a severed link, to position said small end bar or pintle at desired angle with respect to the link side bars.

Each of the elements 91 of the upper die 25 of the fourth set of rolls includes a transverse, concave, substantial quarter-circle forming surface 92. Extending outwardly from the inner end of the quarter-circle 92 is a radial face 93 terminating in a transverse, concave, arc shaped (substantial quarter-circle) forming surface 94 itself terminating in the perimeter or circumference of the die 25 at a distance from the quarter-circle 92. The radial face 93 and forming surface 94 meet each other to define a transverse cutting edge 95 within the confines of said die 25 and at a slight distance from the circumference of the die 25. The part-circle surfaces 92 and 94 extend the full distance across the upper die of the fourth set of dies. Each of the elements 96 of the lower die 27 of the fourth set includes a severing knife or punch 97 with radial face 98 defining cutting edge 99 complemental to cutting edge 95. The punch has a convex forming surface 100 in advance of the cutting edge 99 and complemental to the quarter-circle 92. The lower die 27 includes circular, spaced apart flanges 101 providing a space 102 between the flanges of approximately the width of the long, narrow lip for the sprocket or large end bar of the link. The peripheral surfaces of these flanges are constructed to engage the side bars of a link blank as the same passes between the rolls of the fourth set, to cooperate with the upper die 25 in insuring forward, horizontal feeding of the link. The combined action of the cutting edges 95 and 99 is to sever the stock along the lines of score made by the scoring knives 49, 52, while the action of the upper and lower forming surfaces 92 and 100 is to throw the short, wide lip of the sprocket bar further upwardly and thus throw the long, narrow lip of said sprocket bar further downwardly in the space between the flanges 101. At the rear of the severing knife or punch 97 and between the flanges 101 is a crimping tool 103 having a transverse, concave, arc-shaped (substantially quarter-circle) crimping surface 104 complemental to the part-circle 94. The action of the part-circle surface 104 is to cause the previously shaped narrow lip of the small end bar or pintle to move forwardly and upwardly in the space between the flanges 101, the previously shaped wide lip of the small end bar or pintle being forced up against the part-circle surface 94. Forward and upward movement of the narrow lip of the small end bar or pintle places the whole of said small end bar or pintle approximately at a right-angle to the side bars of the link. See Fig. 11. The small end bar might be placed in its final position, at proper angle to the link side bars, in the third set of rolls by providing a suitably constructed and arranged crimping surface 75 and part-circle 90, but for the fact that as the narrow lip of said small end bar rode out from between said surface 75 and part-circle 90 it would probably be straightened out somewhat to lose its quarter-circle form, as will be understood.

The assembling elements may be on the last set of rolls. The lower die 32 of the last set has elements 105 each of which includes a part-circle surface 106 preferably slightly less than a half-circle, and the upper die 30 of this set has similar, complemental elements 107 each including a part-circle surface 108 with spacing mandrel 109 arranged transversely of the die to define a quarter-circle arc at the forward portion of the part-circle surface 108, the spacing mandrel being for the purposes of providing the detaching slot present in the finished chain and for locating the short, wide lip of the large end bar of the link in said part-circle surface 108. Obviously, the part-circle surfaces 106 and 108 are complemental, their combined action serving to roll the long lip or end hook to circular form.

Mechanism is provided for guiding a strip of metal, as well as detached, unfinished blanks, between the rolls of the different sets.

Of this mechanism, 110 denotes a strip gage arranged transversely just in advance of the first set of rolls for centering the metal strip with respect to the dies, the gage being secured upon upright 2 as at 111. It consists of a bar of metal the top of which is cut to provide a V-shaped groove 112 with the axis of the V in the vertical central longitudinal plane of the dies. The walls of the V-shaped groove are preferably elevated somewhat above the horizontal plane of the line of feed and the taper of the gage allows for variation in width of the strip of metal to insure its proper centering despite its variations in width.

113 denotes, generally, a different form of gage, between the first and second and second and third sets of rolls. Each gage 113 consists of a cylindrical roller 114, supported on the frame in any manner just above the line of feed of the strip of metal, and a roller 115 below the strip having a V-shaped groove 116, adapted to function in the general manner of the V-groove 112, to center the strip. The V-groove 116 is constructed to allow clearance for passage of the strip, even though partially formed, as when passing from the second to the third set of rolls. 117 denotes projections on the base of the machine each with opening 118 slidably receiving a shank 119 with fork 120 by which the V-roller 115 is rotatably supported. 121 is a coil spring between the shank and the end of each opening. Obviously, the coil spring provides for a resilient engagement of the taper walls of the V-roller with the strip, and the cylindrical roller and V-roller cooperate to better accomplish the guiding.

122 is a blank receiving guide to receive the severed blanks as they pass beyond the fourth set of rolls. The construction of this guide will be clear from Figs. 3, 4, 11 and 17. 123 is an L-shaped bracket secured upon the machine frame as at 124. The blank receiving guide is supported by this L-shaped bracket and includes a top wall 125, side walls 126 spaced apart a distance to allow ready passage of the severed link blank, and overhanging walls 127 for insuring that the body of the blank cannot become displaced from the receiving guide, the overhanging walls being spaced at sufficient distance apart to allow ready passage of the downwardly extending stock of the short end bar or pintle and the stock to form the long, narrow lip of the link for providing the large end bar thereof. The overhanging and side walls as shown extend a slight distance beyond the end of the top wall of the blank receiving guide in the direction of the fifth set of rolls, and said top wall is desirably shaped at its forward end to best guide the short, wide lip of the link blank to the portion of the part-circle 108 in front of the mandrel 109.

The operation of the machine thus far described will be readily understood. A strip of metal A is guided between the rearward or first set of rolls and power is applied to rotate all of the rolls so that the strip is continuously fed forwardly. The strip is guided and centered by all of the gages so as to lie properly between all of the sets of rolls. A section of metal which is to form a link blank is first acted upon by the scoring knives 47, 50, 48, 51, and 49, 52, to score the upper and lower surfaces of the stock along the lines 128, 129, and 130, respectively, to thus completely outline the blank. Thence the section outlined for the blank passes beyond the rearward rolls and the succeeding scoring knives of the first set move forwardly and vertically, uniformly and gradually, into the forwardly moving stock to repeat the outlining operation just described. Eventually, the link blanks pass successively between each set of rolls, and the upper and lower dies of each other set cause the working elements to move toward and with the strip of metal in the same general manner as do the upper and lower dies of the rearward set of rolls.

The action of the severing and crimping elements of the upper and lower dies of the second set of rolls is to sever the stock along the line of score 129 and along the portions of the lines of score 128 adjacent said line of score 129; to crimp or form the forward or free end of the central portion or long, narrow lip of the sprocket bar of each link; and to crimp or preliminarily form the central portion or narrow lip of the small end bar or pintle of said link. The severing edges 61 and 66 of the dies of the second set cooperate to sever the metal along the lines of score 128 adjacent the line of score 129, and the severing and crimping punch 55 simultaneously severs the metal along said line of score 129. The combined action of the crimping surfaces 58 and 68, and of the crimping edge 59 and radial face 67, is to throw the severed free end of the central portion or long lip downwardly below the plane of the strip of metal and to give to said free end a quarter-circle crimp, as indicated at 131. The combined action of the crimping surface 56, crimping edge 57, radial face 63, and crimping surface 64 is to throw the severed narrow lip of the short end bar downwardly below the plane of the strip of metal, as indicated at 132, and to give to said narrow lip a crimp or preliminary forming which is less than a quarter-circle. It will be apparent from Figs. 4, 8 and 8ᵃ that the peripheral faces of the dies 15 and 17 themselves are in engagement with the upper and lower faces of the metal of the strip constituting the side bars of the link blanks while the severing, crimping and preliminary forming elements of said dies 15 and 17 are operating.

The action of the upper and lower dies of the third set of rolls is to sever the body of the central portion or long lip of the link blank adjacent its severed and crimped or formed end; to throw the short, wide lip of the sprocket bar of the link upwardly and the severed long, narrow lip thereof downwardly and to simultaneously shape the short, wide lip of the sprocket bar; and to shape the wide lip and further shape the narrow lip of the small end bar or pintle.

The combined action of the shearing and bending projection 74 and the cutting edges 77 and 89 is to sever the metal along the lines of score 128 and to bend the central portion or long, narrow lip below the plane of the strip of metal, as indicated at 133. The combined action of the part-circle surfaces 70 and 84 is to throw the short, wide lip of the sprocket bar upwardly and impart to it final shape; that is, quarter-circle shape, as indicated at 134. Naturally, the downward throwing of the severed metal for the long lip of the sprocket bar assists the operation of throwing upwardly the wide lip thereof, and vice versa. The short, curved shaping surface is, in effect, an axis about which the large end bar or end hook is turned during the operations upon the sprocket bar in the third set of rolls. The combined action of the part-circle surfaces 71 and 85 is to shape the wide lip of the small end bar to its final quarter-circle form, as indicated at 135, and the crimping face 75 and curved portion 90 combine to finally shape and round said narrow lip, as indicated at 136. The flanges 87 cooperate with the peripheral surface of the die 20 in feeding the metal strip horizontally forwardly while the severing, bending, and forming operations are being accomplished by the third set of rolls, and a space 88 between the flanges 87 and elements 82 allows ready passage of each long lip beyond the die 22. See Figs. 4, 9 and 10.

The action of the upper and lower dies of the fourth set of rolls is to sever the link from the strip, and to simultaneously throw the short, wide lip of the sprocket bar of said link further upwardly and the long, narrow lip thereof further downwardly, to the final forming and assembling position of said sprocket bar; and to position the small end bar or pintle of a following or succeeding, adjacent link at desired angle with respect to the side bars of said adjacent link.

The combined action of the cutting edges 95 and 99 is to sever the stock along the line of score 130. The combined action of the part-circle surfaces 92 and 100 is to throw the short, wide lip of the sprocket bar further upwardly and thus throw the long, narrow lip thereof further downwardly in the space 102 between the flanges 101, to place the sprocket bar almost vertical and in its final forming and assembling position, as indicated at 137. The action of the part-circle surface 104 is to move the narrow lip of the small end bar or pintle forwardly and upwardly, as indicated at 138, and thus position said small end bar or pintle with respect to the link side bars. The part-circle surface 104 rides against the rearward, lower surface of the partially formed narrow lip of the small end bar or pintle and causes said narrow lip to be swung forwardly and upwardly. The upward swinging of said narrow lip, naturally, causes the wide lip to be forced up and back against the part-circle surface 94, to be engaged by said surface 94 in such manner that the quarter-circle shape obtained by said wide lip in the third set of rolls is maintained. The part-circle surfaces 94 and 104 are positioned relatively to each other so that the finished small end bar or pintle is approximately vertical, at right-angles to the side bars of the link. The flanges 101 cooperate with the peripheral surface of the die 25 in feeding the link blank horizontally forwardly while the severing, bending and forming operations are being accomplished by the fourth set of rolls, and a space 102 allows ready passage of the long lip of each severed link into and out of the die 27. See Figs. 4 and 11.

The action of the upper and lower dies of the last set of rolls is to finally shape the end hook or lip around the small end bar of the following or succeeding severed link blank. Previous to reaching the final set of rolls, the short, wide lip and the outer end of the narrow lip for the large end bar of the link have been properly crimped to assist the rolling of the sprocket bar to circular form, as denoted at 139, and the part-circle surfaces of the upper and lower dies of the final set, including the transversely arranged mandrel 109 in one of said part-circle surfaces, defining the detaching slot 140 in the finished chain, nicely cooperate to provide a cylindrical sprocket bar.

All of the forming, severing and assembling elements have forward motion with the strip of metal, as well as vertical motion. It is this forward motion of the elements with the strip that makes possible the transformation of the metal into connected chain links while being fed.

A rotatable die of the present machine may have any preferred number of duplicate working elements. As disclosed, several links are at all times on their way from one set of rolls to the next during the operation of the machine, and the first four sets of rolls serve to feed the strip of metal forwardly, although the strip could be fed in some other manner (not shown). As the working faces or elements of the oppositely disposed dies of the different sets of rolls are all located to position the whole length of strip metal in a horizontal plane, the fact that several link blanks are always traveling from one set of rolls to the next is no detriment to the feeding of the strip metal by the sets of rolls, especially when the gages 113, between the first and second, and second and third sets, are employed. However, a special device is required to guide the severed blanks from the fourth to the fifth, or assembling, set of rolls, and the severed blanks must be fed from the fourth to the fifth set in a manner different from the manner of feed of the strip from the first to the fourth set of rolls. The blank receiving guide constitutes this device, and the link severing punch feeds the severed blanks through the receiving guide, to the assembling rolls. After a section is severed, the convex crimping surface 100 of the blank severing knife 97 pushes, as it rotates forwardly, against the rear end of the severed link blank to force the front end thereof against the rear end of the next adjacent link blank. Before a severed link blank has left the fourth set of rolls, the forward end of the blank has been pushed into the blank receiving guide 122. The severing knives 97, forcing each blank ahead as soon as severed, feed the several blanks through the receiving guide and to the assembling elements.

The forward end of the blank receiving guide is sufficiently close to the dies of the last set of rolls so that the short, wide lip and long, narrow lip to provide the sprocket bar will be positioned in the part-circle surfaces of the upper and lower dies, respectively. As shown, the free end or crimped portion of the long lip first contacts with the die 32 and the receiving guide allows a lifting movement of the end hook to the die 30, whereby the part-circle surfaces can best cooperate to turn the long lip to circular form about the small end bar or pintle of the following or succeeding link. The arrangement of the spacing mandrel on the part-circle surface of the upper die of the last set is such that the short, wide lip of the end hook can position in front of said mandrel, the blank receiving device cooperating in the guiding of the wide lip, as shown.

Figure 2:
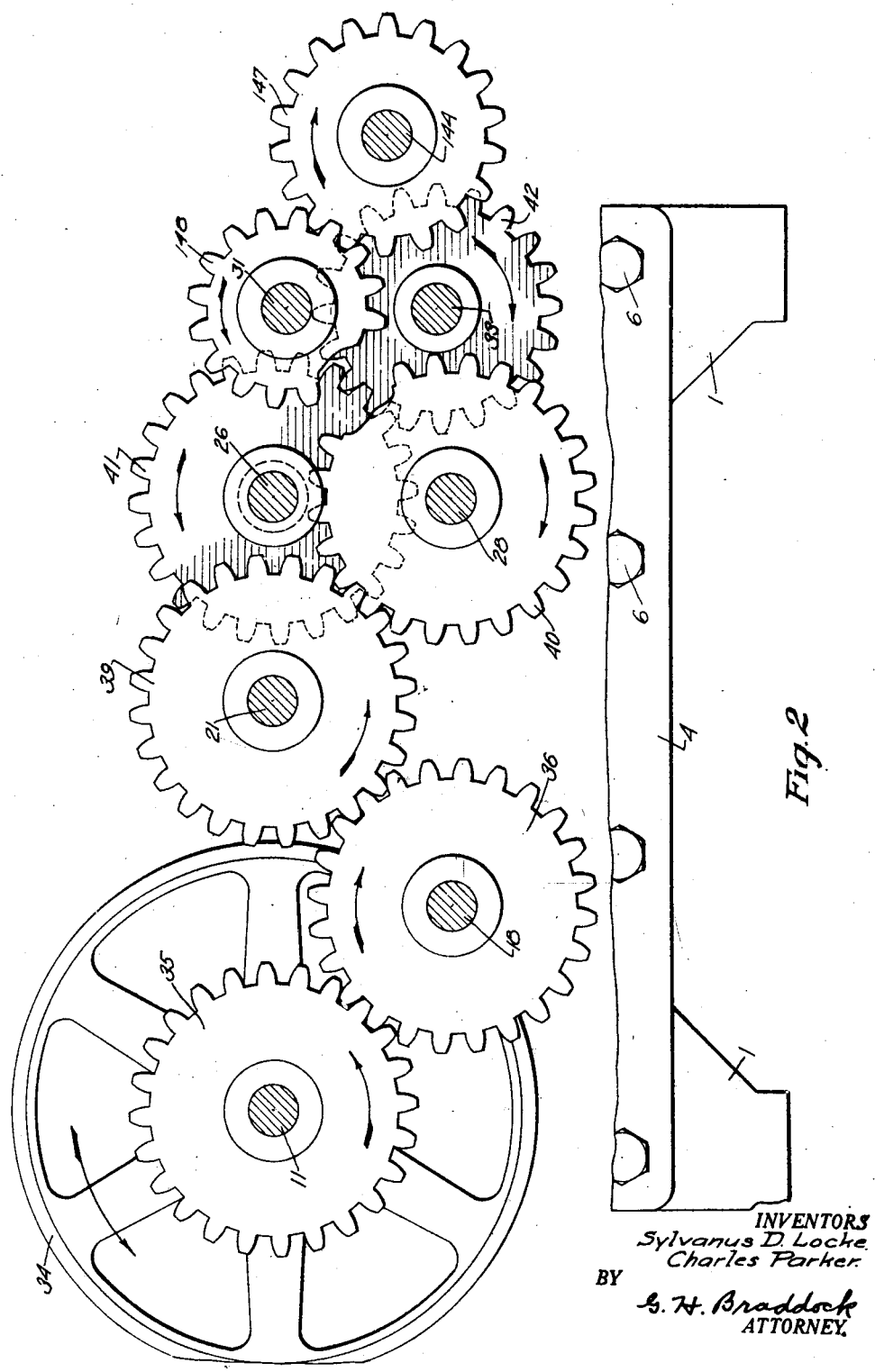
Fig. 2 is a sectional view on line 2—2 in Fig. 1, detailing features of the drive side of the machine.
Figure 3:
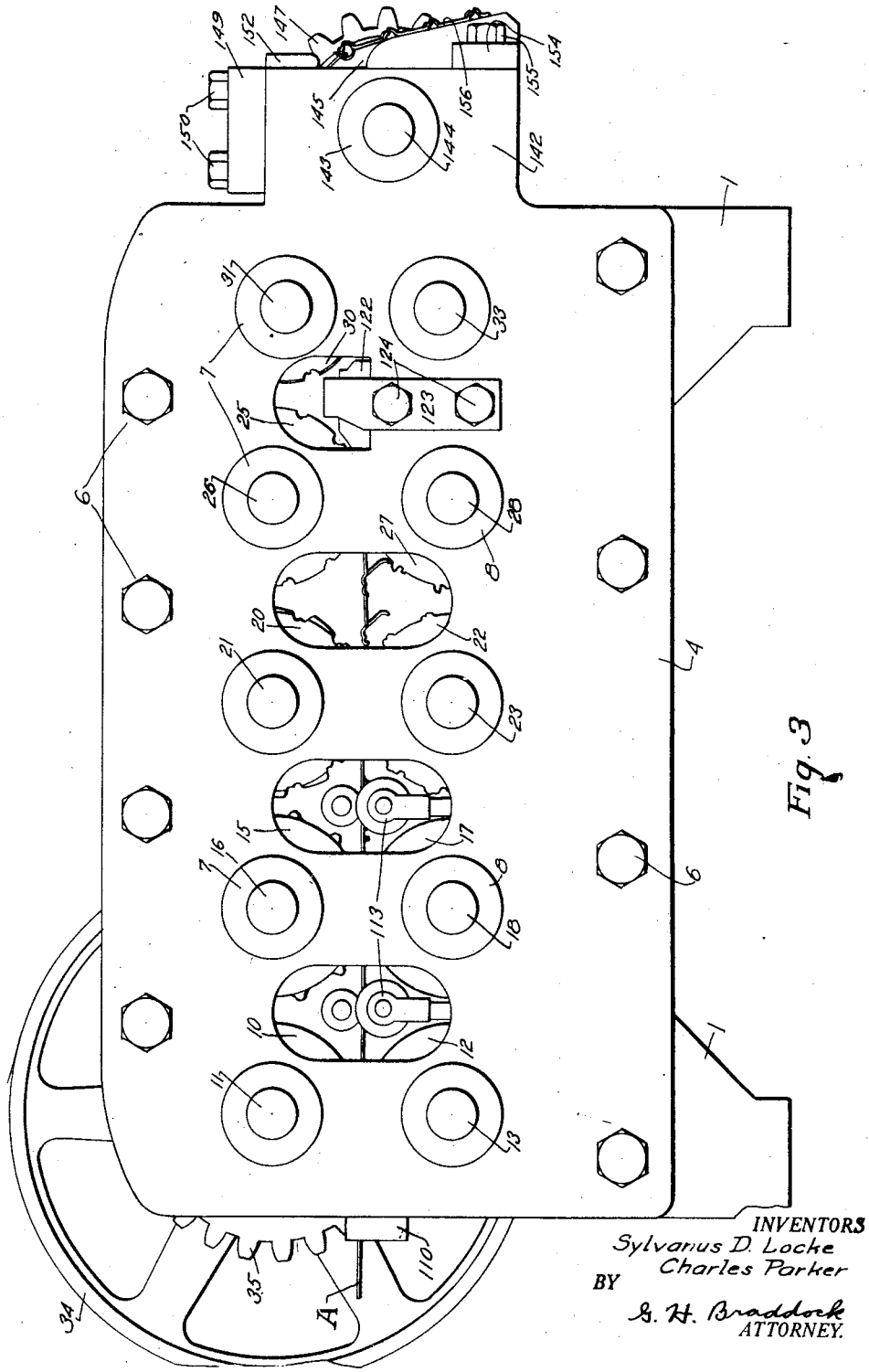
Fig. 3 is an elevational view of the machine of Fig. 1, looking at the side thereof opposite the drive side.

The vertical uprights 2 and 4 have extensions, denoted 141 and 142, respectively, with bushings 143 in which a shaft 144 carrying a sprocket wheel 145, forming a part of a link sizer or stretching mechanism, is mounted. The shaft 144 has a gear 147 which meshes with a gear 148 on the shaft 31, whereby rotation of said shaft 31, with its rotatable die 30, causes the sprocket wheel 145 to rotate, at the same speed as all of the rolls, in the direction of the arrow in Fig. 2. The sprocket wheel 145 is fixed upon the shaft 144 in the line of feed of assembled links passing from the last set of rolls.

Figure 1:
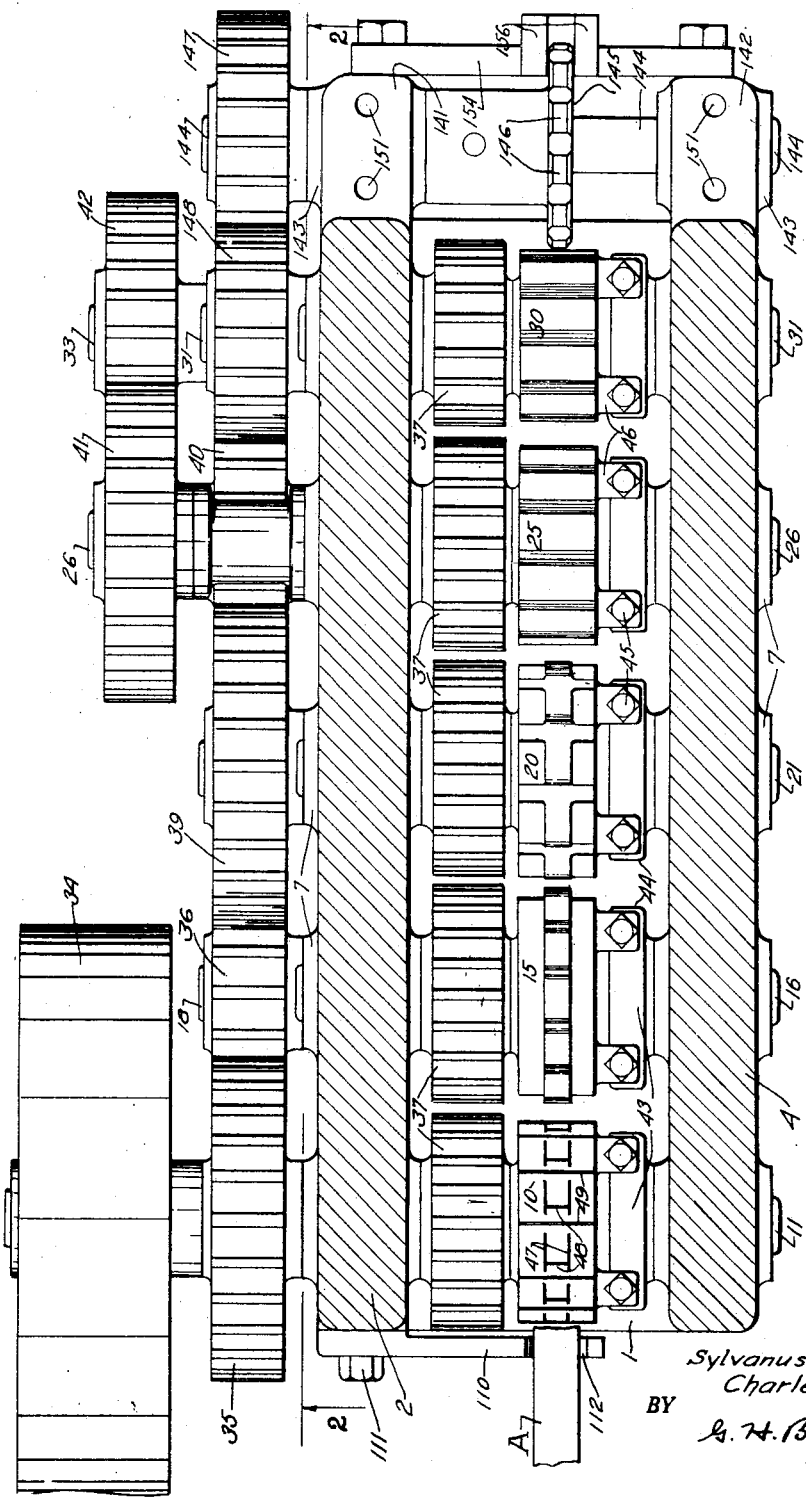
Fig. 1 is a sectional view, on line 1—1 in Fig. 5, of a machine illustrating one way of carrying out the invention, the improved apparatus being incorporated in the machine, and a part of the sizer or stretching mechanism being omitted.
Figure 4:
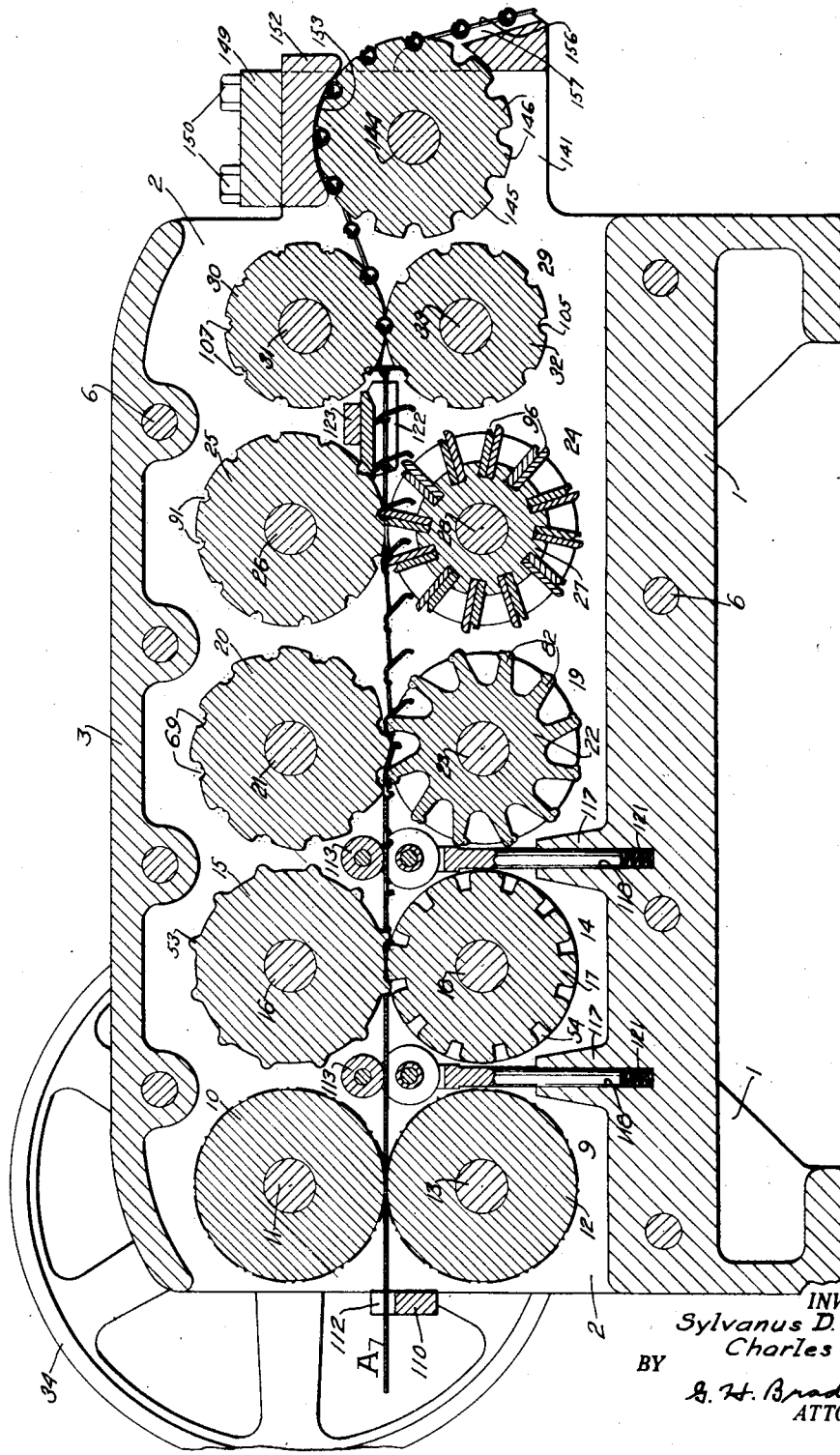
Fig. 4 is a longitudinal sectional view on line 4—4 in Fig. 5.
Figure 6:
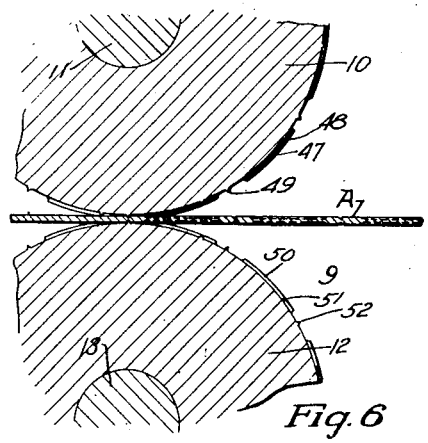
Fig. 6 is an enlarged fragmentary vertical sectional view detailing the first set of rolls.
Figure 7:
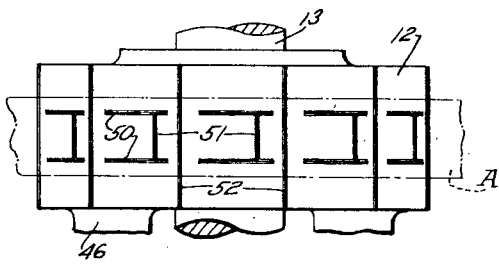
Fig. 7 is a top plan view of the bottom roll of Fig. 6.

The remainder of the link sizer or stretching mechanism is best disclosed in Fig. 4 and is omitted from Fig. 1. In said Fig. 4, 149 represents a cross bar adapted to be secured to the upper faces of the extensions 141, 142, as by means of screw bolts 150 adapted to enter threaded holes 151, best shown in Fig. 1, and 152 denotes a presser plate, secured to the cross bar 149 in any suitable manner and adapted to lie between the extensions 141, 142, closely adjacent the sprocket wheel 145. As illustrated, the inner, or lower, face 153 of the presser plate describes an arc concentric with the perimeter of the sprocket wheel. The individual teeth 146 of the sprocket wheel are desirably of thickness not much less than the distance between the side bars of a link, and said teeth are each of width at their bases a trifle greater than the distance between sprocket bars when links are assembled, tapering gently to the perimeter of the sprocket wheel where they are of width to easily enter each link when assembled. The margin of the sprocket wheel between teeth is preferably of that curvature best suited to receive sprocket or large end bars.

The manner in which the sizer or stretching mechanism functions is obvious. When a formed and coupled link which has left the fifth set of rolls (the spacing mandrel naturally receding from the detaching slot of the sprocket bar which it defines) shall have been associated with a tooth of the sprocket wheel, advancement of the sprocket wheel, in synchronism with the sets of rolls, will carry the link beneath the face 153 of the presser plate. The presser plate will, naturally, force the link, with pressure, down upon the tapered faces of said tooth. Each assembled link thereafter coming from the fifth set of rolls will likewise pass beneath the presser plate. Referring to Fig. 4, it will be seen that the pressure of the presser plate is exerted against the sprocket or large end bars of the links, to push said bars down toward or to the margin of the sprocket wheel between its teeth. All of the teeth of said sprocket wheel are duplicates and the teeth are spaced uniform distance apart, and therefore, the pressure exerted to stretch the span between the sprocket bars of adjacent links will be the same in the instance of each of the links. Consequently, when the links shall have passed from beneath the presser plate, the span between the sprocket bars will be the same for all of the assembled links; that is, the links will be stretched up to size. It is found advantageous when manufacturing links of the present nature, (strip metal slightly varying in thickness must necessarily be utilized), to make provision in the structure of the apparatus to insure that all of the links will be of size a trifle less than a predetermined size, and to employ a sizer or stretching mechanism to bring each link up to said predetermined size.

After the assembled links have passed from beneath the presser plate, it is, obviously necessary that they be stripped from the teeth of the sprocket wheel. The mechanism for so stripping the links may consist of a cross bar 154 bolted at 155 to the side edges of the extensions 141, 142, and having spaced apart guide surfaces 156 for the side bars of the links. Between the guide surfaces is a clearance space 157 for the narrow lips of the link end bars. The surfaces 156 will be at that oblique angle to the circumference of the sprocket wheel and at that location relative to the teeth of said sprocket wheel to best insure proper stripping; that is, to best insure that the side bars of the former and coupled links will be certain to ride upon the guide surfaces and off of the sprocket wheel teeth, away from the axis of said sprocket wheel. See Figs. 3 and 4.

It is to be noted that the only feed necessary on the machine is the working elements and dies themselves, although the feeding could be accomplished otherwise. The elements of the first four sets of rolls cooperate to feed the strip of metal; the severing knives and dies of the fourth set of rolls feed the severed blanks and force them to be pushed, one by the other, into the assembling elements of the final set of rolls; and the sprocket wheel of the sizing mechanism carries the finished chain out of the machine.

The advantages of having the link blank outlined by the first set of rolls is obvious. The machine is thus simplified and the difficulty of timing a plurality of sets of rolls to make the parts of the links uniform is eliminated.

The operations in the present machine, as compared with similar operations in certain machines, utilizing reciprocating dies heretofore known, are reversed; that is, changes end for end, but the sequence of operations is the same as for reciprocating dies. This accomplishes three results: (1) When the long or hook lip of the sprocket bar has been turned down by the action of the rolls 19 and of the cut-off knife 97 of the rolls 24 and said rolls continue their rotation, this long lip is moving away from the element 82 and the base of the cut-off knife. Otherwise said element 82 and the knife would have to be undercut or the long lip would be bent. (2) In the closing rolls 29 the short lip of the sprocket bar positions naturally into any part of the quarter-circle in front of the approaching slot spacing mandrel 109 when the blank is pushed out of the line of the strip by contact of the long lip with the finishing roll 32. If the links were reversed it would be difficult to position the lip back of the mandrel as it would be likely to position in front or on top of the mandrel. (3) The hook is rolled up toward the wide part of a convergent pair of jaws which is easier and gives less friction than would be the case if rolled toward the narrow end of the jaws.

When the blanks are cut from the strip they are pushed together with small end bar of one link concentric with sprocket bar of an adjacent link so that each hook is rolled around the small end bar or pintle of the next link and assembling thus accomplished without further mechanism.

Many alterations in the construction and many apparently widely differing embodiments and applications of the invention will suggest themselves to those skilled in the art of making sheet metal chain links and chain making machines without departing from the scope and spirit thereof. The disclosure and description herein are purely illustrative, and are not intended to be in any sense limiting.

What we claim is:

1. In a machine for making chain from a strip of sheet metal, each link of the chain having side bars, a relatively small end bar, and a relatively large end bar or end hook constituted by a long, narrow lip and a short, wide lip, means for feeding the strip forwardly, means for imparting lines of score to the strip to completely outline the blank for each link, means for severing the metal along the scored lines at the center of the blank and for crimping said metal to define an end of the long lip of said large end bar or end hook, means for severing the metal an additional amount along said scored lines to define said long lip adjacent its crimped end and for simultaneously shaping the short, wide lip of said large end bar or end hook to final form, means for severing the blank from the strip along the scored lines defining the ends of the blank and for shaping said large end bar or end hook for its rolling operation, and means for finally rolling said large end bar or end hook to circular form, all of the forming, severing and assembling means having forward movement with the strip of metal.

2. In a machine for making chain from a strip of sheet metal, each link of the chain having side bars, a relatively small end bar constituted by a short, narrow lip and a short, wide lip, and a relatively large end bar or end hook constituted by a long, narrow lip and a short, wide lip, means for feeding the strip forwardly, means for imparting lines of score to the strip to completely outline the blank for each link, means for severing the metal along the scored lines at the center of the blank and for crimping said metal to define an end of the long lip of said large end bar or hook and to define the short, narrow lip of said small end bar, means for severing the metal an additional amount along said scored lines to define said long lip adjacent its crimped end and for simultaneously shaping the short, wide lip of said large end bar or end hook to final form and for simultaneously shaping the short, wide lip of the small end bar of an adjacent following link to final form, means for severing the blank from the strip along the scored lines defining the ends of the blank and for shaping said large end bar or end hook for its rolling operation, said last mentioned means being adapted to shape said preceding small end bar to final curvilinear form, and means for finally rolling said large end bar or end hook to circular form about a small end bar of a succeeding link, all of the forming, severing and assembling means having forward movement with the strip of metal.

3. In a machine for making chain from a strip of metal, means for feeding the strip, working elements for successively operating upon the strip concurrently with the feeding thereof to transform the strip into connected chain links, and means for sizing said links.

4. In a machine for making chain from a strip of metal, means for feeding the strip, working elements for successively operating upon the strip concurrently with the feeding thereof to transform the strip into connected chain links, and means moving with the strip and links for forming each link to a predetermined size.

5. In a machine for making chain from a strip of metal, means for feeding the strip, working elements for operating upon the strip concurrently with the feeding thereof, said working elements having forward motion with the strip of metal, and means having forward motion with the strip for stretching each link of the chain produced up to a predetermined size.

6. In a machine for making chain from a strip of metal, means for feeding the strip forwardly, rotatable working elements for operating upon the strip while in motion to transform the same into chain links, said working elements moving forwardly with the strip, and means having forward motion with the strip for forming each link of the chain to a predetermined size.

7. In combination with means for transforming a strip of metal into connected chain links, a sizer adapted to stretch each link up to predetermined size, including a sprocket wheel, means for driving said sprocket wheel, a presser plate adjacent said sprocket wheel and adapted to cause connected chain links to be forced with pressure upon said sprocket wheel, and a stripper for removing the links from said sprocket wheel.

8. In a machine for making a chain link from a section of sheet metal, a link having side bars, a relatively small end bar of curvilinear conformation and consisting of a short, wide lip and a short, narrow lip, and a relatively large end bar or end hook constituted by a long, narrow lip and a short, wide lip, means for feeding the section forwardly, means for imparting lines of score to the section to completely outline the blank, means for severing the metal along the scored lines at the center of the blank defining the long, narrow lip of the large end bar or end hook of the blank and for crimping the end of said long, narrow lip, means for severing the blank from the section along the scored lines defining the ends of the blank and for crimping the short, wide lip of the large end bar or end hook and for shaping said large end bar or end hook for its rolling operation, and means for finally rolling said large end bar or end hook to circular form, all of the forming, severing, and assembling means having forward movement with the section of metal.

9. In a machine for making chain from a strip of metal, means for feeding the strip, oppositely disposed working elements adapted to move toward, into and forwardly with the strip to transform the same into a partially completed link, other oppositely disposed working elements adapted to move toward and into and forwardly with the strip to sever the partially completed link from the strip and to perform shaping operations upon the partially completed link, means for feeding the severed link, oppositely disposed assembling elements adapted to move toward and forwardly with the partially completed link to connect the same with a following partially formed link of the chain being made, means for guiding the strip and severed links through the machine, and means for forming each link of the chain to a predetermined size.

10. In a machine for making a chain link from a section of sheet metal, the link having side bars, a relatively small end bar of curvilinear conformation and consisting of a short, wide lip and a short, narrow lip, a relatively large end bar or end hook constituted by a long, narrow lip and a short, wide lip, means for feeding the section forwardly, means for imparting lines of score to the section to completely outline the blank, means for severing the metal along the scored lines at the center of the blank defining the long, narrow lip of the large end bar or end hook of the blank and for crimping the end of said long, narrow lip, means for severing the blank from the section along the scored lines defining the ends of the blank and for crimping the short, wide lip of the large end bar or end hook and for shaping said large end bar or end hook for its rolling operation, means for finally rolling said large end bar or end hook to circular form, all of the forming, severing, and assembling means having forward movement with the section of metal, and means having forward movement with a link for forming the link to a predetermined size.

11. In a machine for making sprocket chain from a strip of metal, each link of the chain having a small curved end bar at one end and a hook at the other end, a set of rotary dies adapted to act upon a portion of said strip to simultaneously perform a shaping operation upon the small end bar of one link and the hook of an adjacent link.

12. In a machine for making sprocket chain from a strip of metal, each link of the chain having a small curved end bar at one end and a hook at the other end, a set of rotary dies adapted to act upon a portion of said strip to simultaneously perform a shaping operation upon the small end bar of one link and the hook of an adjacent link, and a second set of rotary dies adapted to sever the two links between said end bar and hook.

13. In a machine for making sprocket chain from a strip of metal, each link of the chain having a small curved end bar at one end and a hook at the other end, a set of rotary dies adapted to act upon a portion of said strip to simultaneously perform a shaping operation upon the small end bar of one link and the hook of an adjacent link, a second set of rotary dies adapted to sever the two links between said end bar and hook, and to perform a further shaping operation upon said end bar and hook.

14. In a machine for making sprocket chain from a strip of metal, working elements disposed on opposite sides of the strip and adapted to engage therewith, at least some of said elements having means to perform link-forming operations on said strip, other elements having means to connect the formed links into a chain, means to impart motion to all of said elements lengthwise of the strip during said operations, and a sizing element adapted to engage links of the chain and form them to a predetermined size.

15. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, a rotating die adapted to fold said hook over the end bar of the following link, and a sizing element adapted to engage links of the chain and form them to a predetermined size.

Signed at Bridgeport, in the county of Fairfield, and State of Connecticut, this 31 day of March A. D., 1925.

SYLVANUS D. LOCKE.
CHARLES PARKER.